F. SZANISZLO.
COMBINATION MILK AND LETTER BOX.
APPLICATION FILED OCT. 5, 1918.
1,296,712.
Patented Mar. 11, 1919.
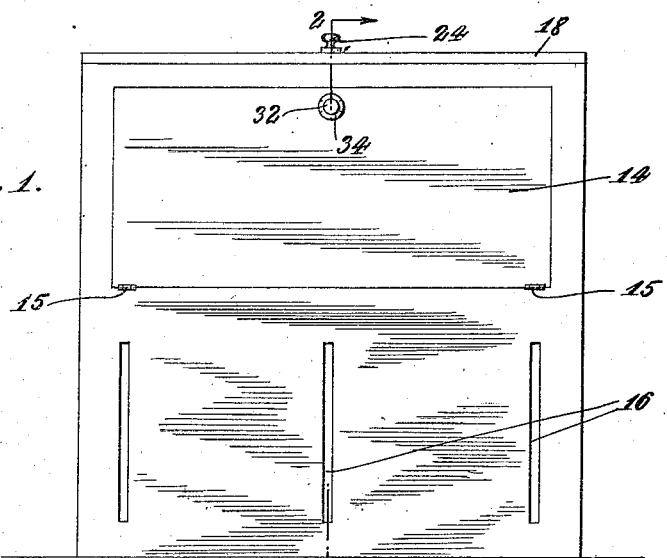
Fig. 1.
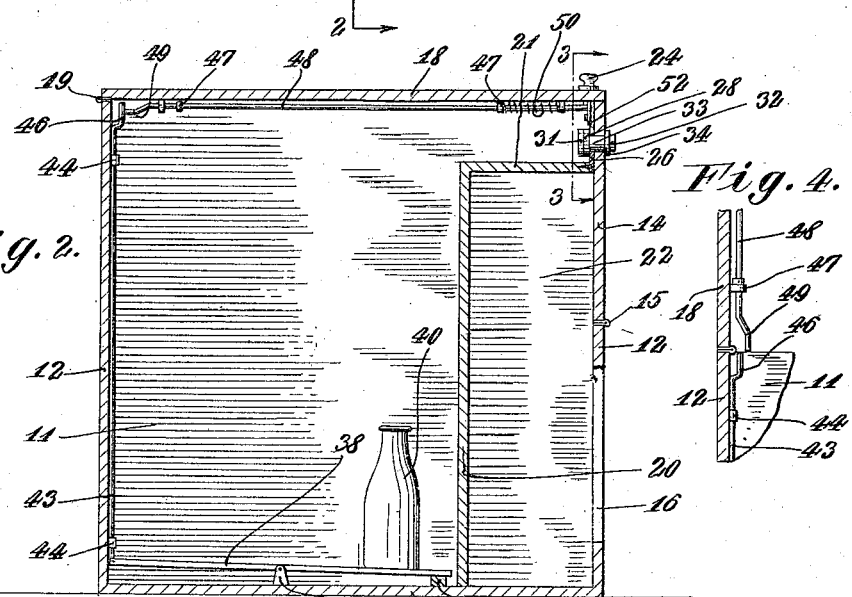
Fig. 2.
Fig. 4.
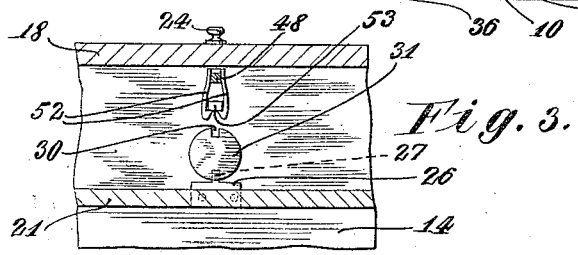
Fig. 3.
INVENTOR
Frank Szaniszlo.
BY Oscar Geier
his ATTORNEY

UNITED STATES PATENT OFFICE.

FRANK SZANISZLO, OF CLEVELAND, OHIO.

COMBINATION MILK AND LETTER BOX.

1,296,712. Specification of Letters Patent. Patented Mar. 11, 1919.

Application filed October 5, 1918. Serial No. 256,957.

*To all whom it may concern:*

Be it known that I, FRANK SZANISZLO, a subject of the King of Hungary, residing at Cleveland, county of Cuyahoga, and State of Ohio, have invented certain new and useful Improvements in Combination Milk and Letter Boxes, of which the following is a specification.

This invention relates to improvements in combined milk and letter boxes and particularly to types adapted to be disposed exteriorly of a dwelling and suited to receive letter or other mail, and packages, such as milk bottles, as delivered by carriers during the absence of the occupants of the dwelling.

The principal object of the invention is to provide a container which, immediately upon the entry of the parcel, becomes automatically locked and remains in a locked position until such time as the side entrance thereto has been opened.

A further object is to provide devices whereby the container becomes automatically locked, upon the closing of the lid, the side door being provided with a lock of permutative character.

These and other like objects are attained by the novel construction and combination of parts hereinafter described and shown in the accompanying drawings, forming a material part of this disclosure, and in which—

Figure 1 is a front elevational view showing a container made in accordance with the invention.

Fig. 2 is a vertical sectional view taken on line 2—2 of Fig. 1.

Fig. 3 is a fragmentary transverse sectional view taken on line 3—3 of Fig. 2, and Fig. 4 is a similar fragmentary sectional view showing the cover in a raised position and the operative parts engaged therewith.

Referring to the drawings, the container will be seen to have a solid base 10, from which rise side and end walls respectively 11 and 12, that at the front being provided with a door 14, secured by hinges 15, longitudinal openings 16, being formed through the front wall 12 of the container below the door.

A cover 18 is engaged over the entire top of the container by hinges 19, secured to the rear wall 12, and formed internally of the container is a vertical partition 20, having an integrally formed top 21, the same inclosing a chamber 22, adapted to receive mail inserted through the elongated slots 16, and which is enterable when the door 14 is open.

A knob 24 is secured to the cover plate 18 at the edge opposite the hinges 19, so that the same may be raised in a convenient manner.

Immediately over the top 21 of the chamber 22, for receiving the mail, is a plate 26, from which extends a spur-like projection 27, engageable within recesses formed in the periphery of a disk 28, a similar recess 30 being likewise formed in the periphery of another disk 31, provided with a stem which extends through the door 14, and has engaged upon its outer end an operating knob 32.

Circumjacent to the stem is a sleeve 33, to which the disk 28 is attached upon one side and a similar disk 34 upon the other, outer side, immediately adjacent to the knob 32, both of which bear numerals upon their surfaces so that the recesses formed in the pair of disks 28 and 31 can be brought into alinement and released from the lug 27 when it is desired to open the door 14.

Secured upon a bracket 36, rising from the bottom plate 10, is a pivoted lever 38, one of its ends extending toward the compartment or chamber 22 and suited to receive a package, as the milk bottle 40, the adjacent end of the lever 38, normally resting upon a raised block 41, while the opposite end has pivoted to it the lower end of a rod 43. This rod 43, extends vertically upward closely adjacent to the rear wall 12 and is guided in brackets 44 near its upper and lower ends.

The extreme upper end of the rod is bent outwardly, as at 46, the vertical portion extending parallel with the main rod 43, and similarly engaged by brackets 47, is a horizontally disposed bar 48, immediately below the lower surface of the hinged cover 18, and provided with a parallel lower, downturned portion 49 with which the vertical element 46 is adapted to contact when the cover is in a closed position.

This bar 48 is normally pressed rearwardly due to the pressure of a coiled compression spring 50, arranged at its outer end, and secured to the extreme front end of the bar 48, are a pair of spring hooks 52 adapted, when the cover is closed, to engage with a fixed lug 53 set in the inner surface of the door 14 near its upper edge.

In operation, the chamber 22 may be closed by the door 14, and held in an engaged position due to the permutative features of the lock as hereinbefore described, permitting mail to be entered through the openings 16, where it will be safely contained within the chamber and which may be removed at any time by manipulating the lock in an obvious manner.

In delivering parcels, as a bottle of milk shown, the cover 18 is raised and the bottle placed upon the platform lever 38, at its outer end, whereupon the end is depressed and the vertical bar 43 raised so that when the cover 18, is lowered into an operative position, the elements 46 and 49 engage, forcing the bar 48 forward and causing the spring hooks 32 to engage with the fixed projection 53, thus locking the cover in position.

In order to obtain access to the interior of the container it is first necessary to manipulate the permutation lock and open the door 14, whereupon the cover 18 can be raised in a manner which will be clearly understood.

Having thus described my invention what I claim as new and desire to secure by Letters Patent, is—

1. In a device of the class described, the combination with a hollow rectangular container, partitions, forming two compartments therein, means for entering articles into the smaller of said compartments, a side door on said smaller compartment, lock arranged thereon, a lever hingedly engaged in the main compartment of said container, a vertical rod operated by the action of said lever, a cover hinged over said container, a rod slidably engaged at the lower side of said cover, operative connections between said rods when said cover is in a lowered position, and means for normally retaining said cover when in a closed position until said side door is opened.

2. In a device of the class described, the combination with a hollow rectangular container and compartments formed therein, of a door hinged to the side of said container through which entry may be had to either of said compartments, a permutative lock on said door, a cover hinged over said container, a rod slidably engaged with the lower side of said cover, means for normally pressing said rod rearwardly, a lug fixed in the upper surface of said side door, spring elements carried by said rod engageable with said lug, and means for actuating said rod by the entry of an article to one of said compartments.

3. In a device of the class described, the combination with a hollow rectangular container, compartments formed therein, a door hingedly engaged at the front of said container through which access may be had to either of said compartments, means for locking said door, means for the inlet of mail through the side walls of said container to one of said compartments, a lever pivotedly engaged on the bottom of said container, a vertical rod slidably engaged in said container actuated by said lever, a cover for said container, a slidable bar engaged below said cover, engaging means formed between said bar and rod, a pair of spring hooks engaged with said bar at the front of said container, and a lug with which said spring hook is engageable, said lug being rigidly secured in the upper edge of said side door.

In testimony whereof I have affixed my signature.

FRANK SZANISZLO.

Copies of this patent may be obtained for five cents each, by addressing the "Commissioner of Patents Washington, D. C."